April 22, 1924.
E. KUEHL ET AL
PROTRACTOR
Filed March 25, 1922
1,491,048
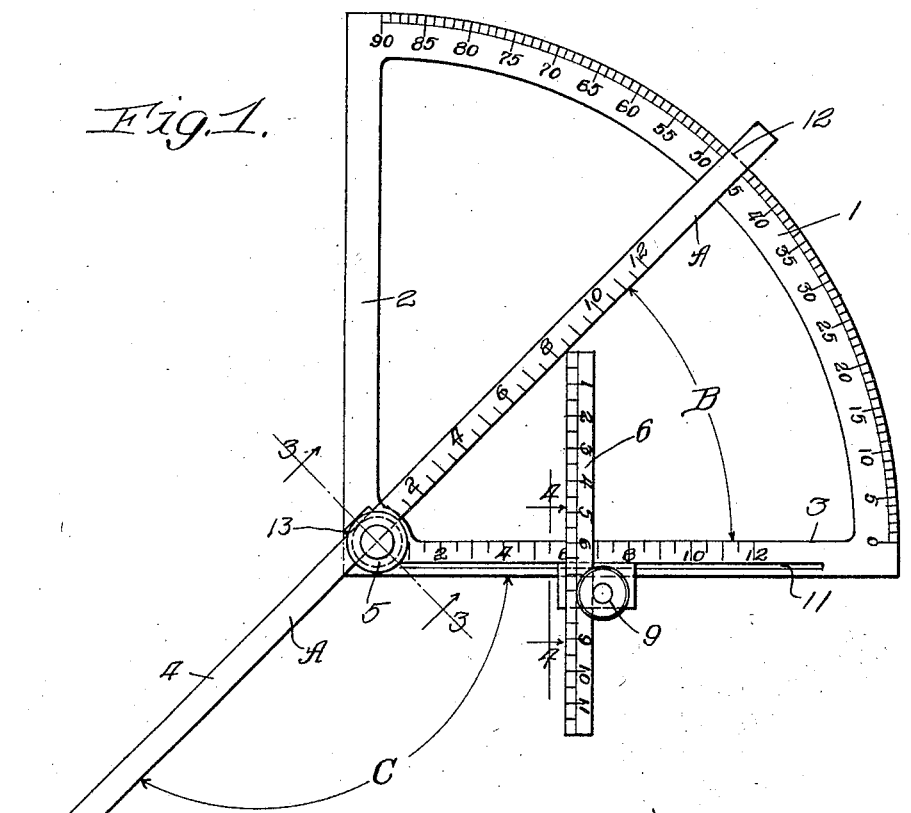
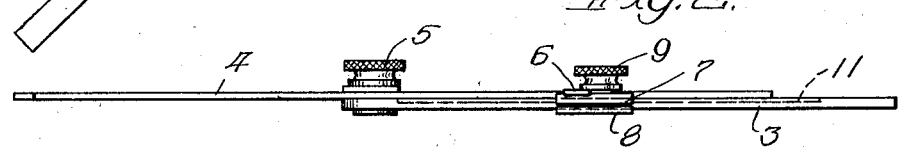
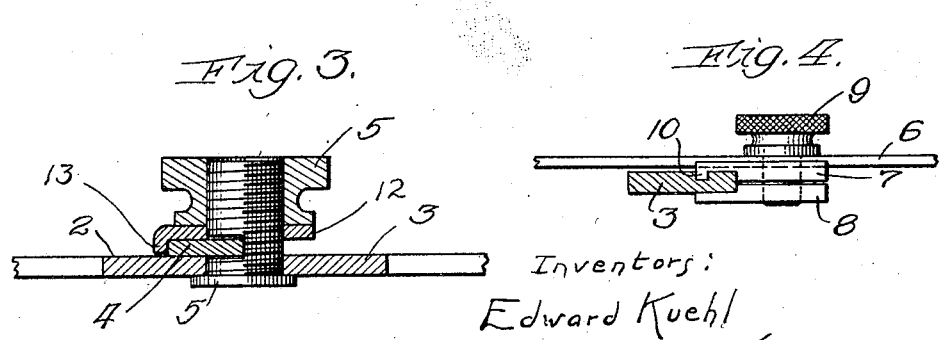
Inventors:
Edward Kuehl
and William F. Krueger
by Albert Scheible Attorney Patented Apr. 22, 1924.

1,491,048

UNITED STATES PATENT OFFICE.

EDWARD KUEHL AND WILLIAM F. KRUEGER, OF CHICAGO, ILLINOIS.

PROTRACTOR.

Application filed March 25, 1922. Serial No. 546,565.

*To all whom it may concern:*

Be it known that we, EDWARD KUEHL and WILLIAM F. KRUEGER, both citizens of the the United States, and both residing at Chicago, in the county of Cook and State of Illinois, have invented certain new and useful Improvements in a Protractor; and we do hereby declare the following to be a full, clear, and exact description of the invention, such as will enable others skilled in the art to which it appertains to make and use the same.

Our invention relates to protractors and in its general aspects aims to provide an unusually simple and easily manipulated appliance which not only will serve the ordinary purposes of a protractor, but which also can be used in a large variety of ways for determining the relations of various linear and angular measurements, for laying out angles corresponding to any relative proportion of the different sides of a right-angled triangle, and for determining the proportion of such sides which will correspond to any angle even if the measurement of that angle is not known.

In machine shop practice, it is often necessary to determine the taper per inch (or other measure of length) which corresponds to a desired angle of taper, and it is likewise often desirable to determine the angle of a given taper. So also, if the proportionate measurements of any two sides of a right-angled triangle are known, it is often desirable to determine the corresponding length of the third side; or conversely, it is often desirable the relative length of the sides of a right-angled triangle which would correspond to a given acute angle between one of the sides and the hypotenuse. Furthermore, it is often desirable to obtain such measurements when only the supplement to the angle (or the difference between the angle and 180 degrees) is given; or conversely to determine this supplemental angle from a given relationship between the sides of the corresponding right-angled triangle.

In some of its practical aspects, our invention aims to provide an easily manipulated and exceedingly simple appliance which will serve all of the above purposes and which also will be convenient for the ordinary purposes of a protractor or even of a steel square. Still further objects will appear from the following specification and from the accompanying drawings in which—

Fig. 1 is a plan view of a protractor embodying our invention.

Fig. 2 is a front view of the same, taken from the bottom of Fig. 1.

Fig. 3 is an enlarged vertical section through the axis of the binding screw which clamps the longer scale or rule, taken along the correspondingly numbered line in Fig. 1.

Fig. 4 is an enlarged and fragmentary transverse section through the side of the protractor which carries the transversely slidable scale, this being taken along the line 4—4 of Fig. 1.

In the embodiment of the drawings, our appliance includes as its main portion or base member a protractor having a graduated and arched side 1 connecting the ends of two straight sides 2 and 3, which sides extend at right angles to each other. Slidably clamped to the resulting arched structure at the apex of the arc is a rule which has a graduated edge A extending through the axis of the graduated arc, this rule 4 being desirably considerably longer than the radius of the arc so that it will project at both ends beyond the said base portion of the appliance. To afford this connection and to afford a pivotal movement of the rule about the axis of the arc, we are here showing a screw 5 as extending through a bore in the base member at the juncture of the portions 2 and 3 thereof. This screw has its axis on the axis of the graduated arc and is transversely slotted from one side exactly to its diameter so as to admit the rule 4 in a position in which one edge of the rule is tangent with the said axis. To hold this graduated edge of the rule 4 snugly against the vertical wall of the slot in the screw we desirably interpose a washer 12 between the knob of the screw and the said rule, this washer having a ledge 13 overhanging the opposite edge of the rule. Then we are showing this rule as clamped against the said base member by a knurled knob 5 which can readily be loosened whenever it is desirable to rotate the rule about the said axis as a pivot or to slide the rule lengthwise so as to make it project further either beyond the graduated arc or in the opposite direction.

Slidably mounted on one of the straight sides of the main member, and in the illustrated protractor on the side 3 thereof, is a clamp which carries a transverse rule 6. This clamp is here shown as consisting of two parts 7 and 8 normally drawn towards each other by a screw 9 which also has a knurled head, the clamp having one portion 8 underhanging the side 3 while the companion clamping portion 7 has a downwardly directed ledge 10 extending into a groove 11 in one face of the said side 3 so as to prevent the clamp from slipping off this latter side. The upper clamp portion 7 is grooved on its top to receive a transverse scale 6 which extends alongside the shank of the screw 9 and which clamps the rule 6 against this top clamp portion 7. Thus arranged, it will be obvious from Figs. 1 and 4 that upon loosening the screw 9, the clamp will be loosened to permit of sliding it longitudinally of the groove 11, while the transverse scale 6 will simultaneously be loosened so that this can be slid transversely of the side 3.

Both the scale 4 and the transverse rule 6 are provided with graduations, which are desirably on the edge of the rule 4 directed towards the side 3 and on the edge of the scale 6 directed towards the pivot screw 5. The graduations on the side 3 preferably are laid out from the axis of the screw 5 (or in other words the axis of the graduated arc) as a starting point, and the rule 4 is provided with graduations which will also read from the same axis as a starting point when this rule is in a predetermined position, as for example when a check line 12 on the same coincides with the edge of the arc as shown in Fig. 1. The transverse scale 6 is also provided with a scale, which scale preferably is on the edge facing the said axis of the arc and which reads from the end which is disposed within the arc or which is uppermost in Fig. 1. Furthermore, the mounting of the rule 4 and the transverse scale 6 is such that these extend in approximately the same plane, as indicated in Fig. 2, so that they can impinge against each other.

With the parts thus arranged, it will be obvious that if the rule 4 is swung until its edge corresponds to any given reading in degrees on the arc, and if the scale 6 is then slid until its tip impinges against the edge A of the rule 4, the readings on the scale 6 and the side 3 of the protractor will indicate the proportionate lengths of the sides of a right-angled triangle corresponding to the said angular setting. Likewise, the reading on the edge A of the rule 4 will indicate the length of the hypothenuse of a right-angled-triangle whose shorter sides correspond to the readings of the scale 6 and the side 3. Such a setting of our appliance will therefore instantly give us the taper corresponding to a given angle B for any given length, and will likewise give the taper corresponding to the complemental angle C which is the difference between 180 degrees and the angle B. Consequently, our appliance affords a simple and speedy means for reading the taper (in inches per foot or the like,) corresponding either to a given angle or to the complement of the latter.

So also, if the linear amount of taper corresponding to a given length of stock is known, the scale 6 can be moved along the side 3 of the appliance by correspondingly sliding the clamp until the graduated edge of this scale corresponds to the given length, after which the scale itself is slid transversely of the side 3 so as to have its projection above that side correspond to the given amount of taper. Then when the pivotal rule 4 of the protractor is swung until its graduated edge abuts against the tip of the scale 6 after the manner in Fig. 1, this graduated edge will show at the arc of the protractor the angle corresponding to that taper. At the same time, the setting thus obtained (which setting may readily be maintained by tightening the clamping knob 5) will enable the user to lay off either the angle B or the angle C corresponding to the said setting, so that the user can instantly scribe either of these angles without bothering to determine the reading of the same in degrees.

Furthermore, it will be evident that the opposed scale portions on the edge A, the side 3 and the scale 6 correspond to the proportionate lengths of the sides of the right-angled triangle having one acute angle B corresponding to the given setting, so that our appliance readily affords means for determining the proportionate length of the side of the triangle, or conversely for determining the angle between any two sides of the triangle when the length of two sides are known.

However, while we have mentioned some of the ways in which our appliance may be used to advantage, we do not wish to be limited to these particular uses of the same. Neither do we wish to be limited to the particular forms of clamps or other details of the construction and arrangement here disclosed, it being obvious that the same might be modified in many ways without departing either from the spirit of our invention or from the appended claims.

We claim as our invention:—

1. In combination with a main member having a groove, a scale, a pair of clamping members embracing opposite sides of the main member and one of which has an inwardly extending part received in the groove and a groove slidably receiving the scale, and a screw extending through the clamping members to clamp the latter onto the main member and engaging the outer face of the scale to clamp the latter in its groove.

2. In combination with a main member having a groove, a scale, a pair of clamping members embracing opposite sides of the main member and one of which has an inwardly extending part received in the groove and a groove slidably receiving the scale, and unitary means to both clamp the clamping members to the main member and to clamp the scale in its groove.

3. In combination with a main member, a scale, scale supporting means embracing opposite sides of a part of the main member and slidable with relation to the latter, and unitary means for adjustably securing the scale to the supporting means and for adjustably securing the latter to the main member.

4. In combination with a main member having right-angular sides and a graduated arc connecting the sides, a scale and means to pivotally mount the scale on the main member so that the graduated edge of the scale extends through the axis of the arc, including a screw peripherally slotted to receive a side of the scale, a washer seated on top of the scale and having a lip engaged with a side of the scale to hold the latter within the screw slot, and a nut on the screw engaged on top of the washer.

5. In combination with a main member having right-angular sides and a graduated arc connecting the sides, a scale, and means to pivotally mount the scale on the main member so that the graduated edge of the scale extends through the axis of the arc, including a screw peripherally slotted to receive a side of the scale, and a nut on the screw for clamping the scale against the main member.

6. In a protractor, a main member having right angularly related sides and a graduated arc connecting said sides, a member having a graduated straight edge, combined pivotal and clamping means to mount said second member on the main member so as to permit both longitudinal and pivotal movement of the second member while having one edge thereof continuously extend through the axis of the arc, the second member being of such length so that each end thereof extends beyond the said axis, a third member having a graduated straight edge, and means to slidably mount the third member on one side of the main member and to always maintain same at right angles to said last named side of the main member in all positions of the parts.

7. In a protractor, a main member having right angularly related sides and a graduated arc connecting said sides, a second member having a graduated straight edge, means to mount said second member so that its said edge extends through the axis of the arc and so that the second member can be moved either pivotally about the said axis or longitudinally, a third member having a graduated straight edge, and means to slidably mount the third member on one side of the main member and to always maintain same at right angles to said last named side of the main member in all poitions of the parts, the third member being disposed in substantially the same plane with the second member so that one end of the third member can abut against the second member, and the third member having graduations thereon reading from its said end.

Signed at Chicago, Illinois, March 20th, 1922.

EDWARD KUEHL.
WILLIAM F. KRUEGER.